United States Patent
Yannam et al.

(10) Patent No.: US 12,177,383 B2
(45) Date of Patent: Dec. 24, 2024

(54) AGENT ASSIST DESIGN—AUTOPLAY

(71) Applicant: Bank of America Corporation, Charlotte, NC (US)

(72) Inventors: Ramakrishna R. Yannam, The Colony, TX (US); Ion Gerald McCusker, Allen, TX (US); Emad Noorizadeh, Plano, TX (US); Priyank Shah, Plano, TX (US); Ravisha Andar, Plano, TX (US)

(73) Assignee: Bank of America Corporation, Charlotte, NC (US)

(*) Notice: Subject to any disclaimer, the term of this patent is extended or adjusted under 35 U.S.C. 154(b) by 611 days.

(21) Appl. No.: 17/388,330

(22) Filed: Jul. 29, 2021

(65) Prior Publication Data

US 2023/0032167 A1 Feb. 2, 2023

(51) Int. Cl.
*H04M 3/493* (2006.01)
*G06F 40/40* (2020.01)
*G06N 20/00* (2019.01)
*G10L 15/26* (2006.01)
*H04M 3/51* (2006.01)

(52) U.S. Cl.
CPC .......... *H04M 3/4936* (2013.01); *G06F 40/40* (2020.01); *G06N 20/00* (2019.01); *G10L 15/26* (2013.01); *H04M 3/5175* (2013.01); *H04M 2203/402* (2013.01); *H04M 2203/55* (2013.01)

(58) Field of Classification Search
CPC ............. H04M 3/4936; H04M 3/5175; H04M 2203/402; H04M 2203/55; H04M 3/5166; G06F 40/40; G06N 20/00; G10L 15/26; G10L 25/21; G10L 25/63
See application file for complete search history.

(56) References Cited

U.S. PATENT DOCUMENTS

| | | | |
|---|---|---|---|
| 10,645,216 B1* | 5/2020 | Hart | H04M 3/4936 |
| 10,827,062 B1* | 11/2020 | Paiva | H04M 3/5232 |
| 11,037,572 B1* | 6/2021 | Beal | G06F 3/167 |
| 11,355,123 B2* | 6/2022 | Trim | G06N 20/10 |
| 2004/0203629 A1* | 10/2004 | Dezonno | H04M 3/4938 455/414.1 |
| 2008/0243744 A1* | 10/2008 | Isaacs | G06F 16/243 706/46 |
| 2013/0165086 A1* | 6/2013 | Doulton | H04L 51/10 455/414.4 |
| 2020/0314245 A1* | 10/2020 | Chavez | H04M 3/5235 |

(Continued)

*Primary Examiner* — Lisa Hashem
(74) *Attorney, Agent, or Firm* — Weiss & Arons LLP

(57) ABSTRACT

A method for filtering a plurality of agent-customer interactions to determine whether one or more of a plurality of agent-customer interactions should be stored in a library of Artificial Intelligence (AI) files related to an interactive voice response system (IVR) is provided. The method may include receiving an identification of a plurality of IVR flashpoints, monitoring and/or reviewing the plurality of agent-customer interactions, and determining whether one of the plurality of agent-customer interactions meets a threshold number of the IVR flashpoints. For each of the plurality of agent-customer interactions that meets a threshold number of the IVR flashpoints, the method may further direct the IVR to convert the interaction into an IVR workflow and store the IVR workflow in the library of AI related to IVR.

16 Claims, 7 Drawing Sheets

(56) References Cited

U.S. PATENT DOCUMENTS

| | | | |
|---|---|---|---|
| 2021/0118440 A1* | 4/2021 | Peng | G06F 40/295 |
| 2021/0216589 A1* | 7/2021 | Ikenaga | G06F 16/686 |
| 2023/0259954 A1* | 8/2023 | Rajshekar | G06Q 30/02 |
| | | | 705/304 |
| 2023/0386649 A1* | 11/2023 | Lennox | G06F 3/0482 |
| 2023/0412731 A1* | 12/2023 | Mundie | H04M 3/5166 |

* cited by examiner

AGENT ASSIST DESIGN—AUTOPLAY

FIELD OF TECHNOLOGY

Aspects of the disclosure relate to computer systems. Specifically, aspects of the disclosure relate to systems and methods for call response system augmentation.

BACKGROUND OF THE DISCLOSURE

This application relates to leveraging interactive voice response (IVR) architecture. There are many aspects to IVR. Many of these aspects relate to providing information for leveraging IVR hubs for use by call-center agents.

It would be desirable to provide IVR hubs that enable call-center agents to more accurately and efficiently respond to incoming calls. It would also be desirable to leverage historical call-center experience in later-in-time responses referenced by call-center agents.

It would be yet further desirable to convert call-center experience into machine-storable and machine-readable information for access by the same or other call-center agents at a later date or time.

SUMMARY OF THE DISCLOSURE

A method for building a library of artificial Intelligence (AI) files related to an interactive voice response system (IVR) is provided. The method may include using the IVR to monitor and record a call-center agent-customer interaction. The monitoring may include using an audio system and/or a voice-to-text system for receiving an audio file related to the interaction and rendering said audio file into a text file.

The method may also include receiving an electronic instruction to convert at least a part of the interaction into an IVR workflow. The IVR workflow may include the text file and/or a plurality of key words.

The converting may use one or more natural language processing (NLP) algorithms to convert the interaction into the IVR workflow. Finally, the method may include storing the IVR workflow in the library of AI files related to IVR. Preferably, the library is searchable by querying a text string.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
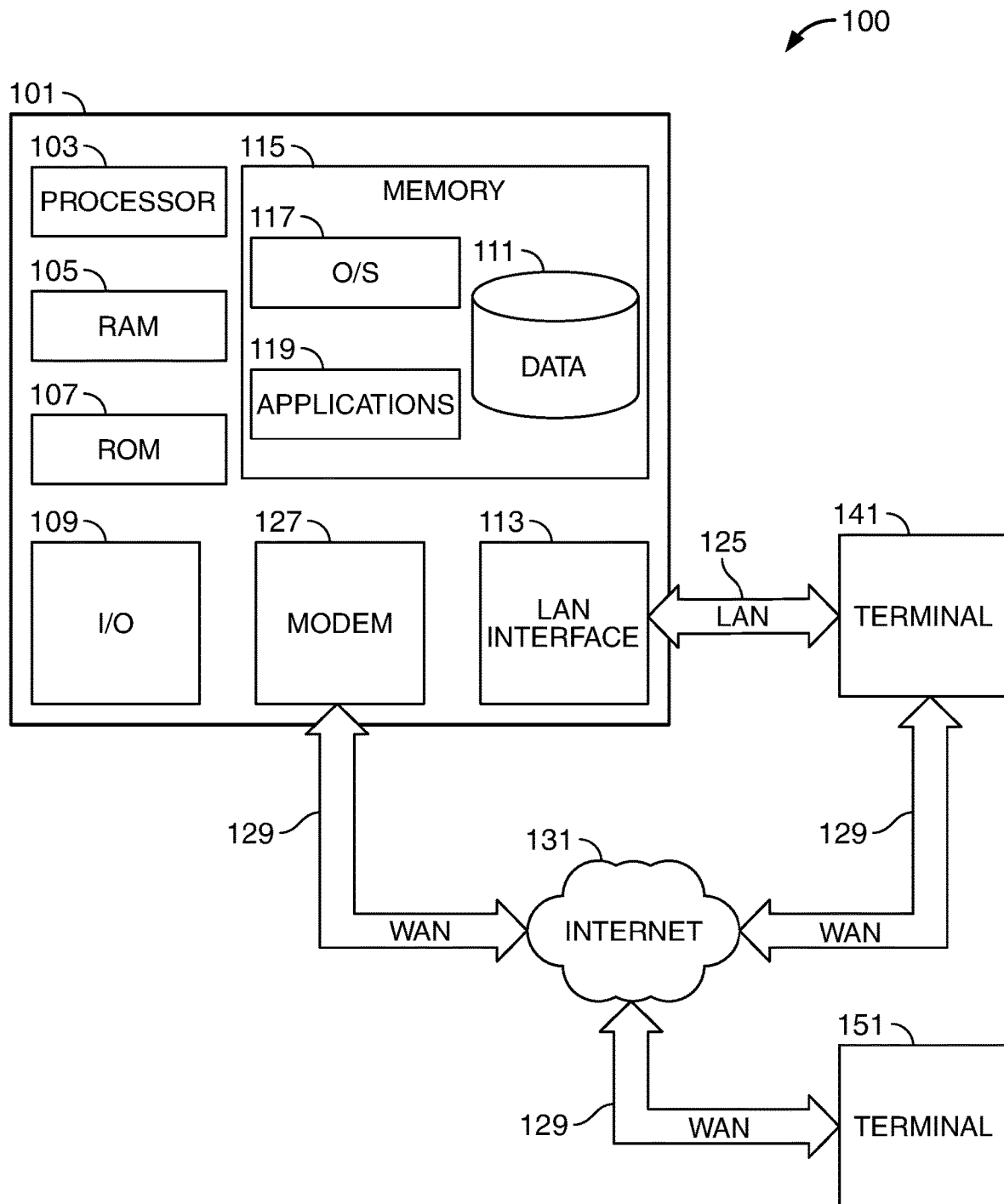
FIG. 1 shows an illustrative block diagram of a system for in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology— e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to interactive IVR hubs. It should be noted that, for the purposes of this application, IVR architecture and/or IVR hubs and/or IVR should be understood to refer to an intelligent front-end/back-end system that aids an agent and/or entity in responding to customer requests.

Computer 101 and/or terminals 141 and 151 may also be devices including various other components, such as a battery, speaker, and/or antennas (not shown).

Terminal 151 and/or terminal 111 may be portable devices such as a laptop, cell phone, Blackberry™, tablet, smartphone, or any other suitable device for receiving, storing, transmitting and/or displaying relevant information. Terminals 151 and/or terminal 111 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. It should be noted that such modules may be considered, for the purposes of this application, as engines with respect to the performance of the particular tasks to which the modules are assigned.

Figure 2:
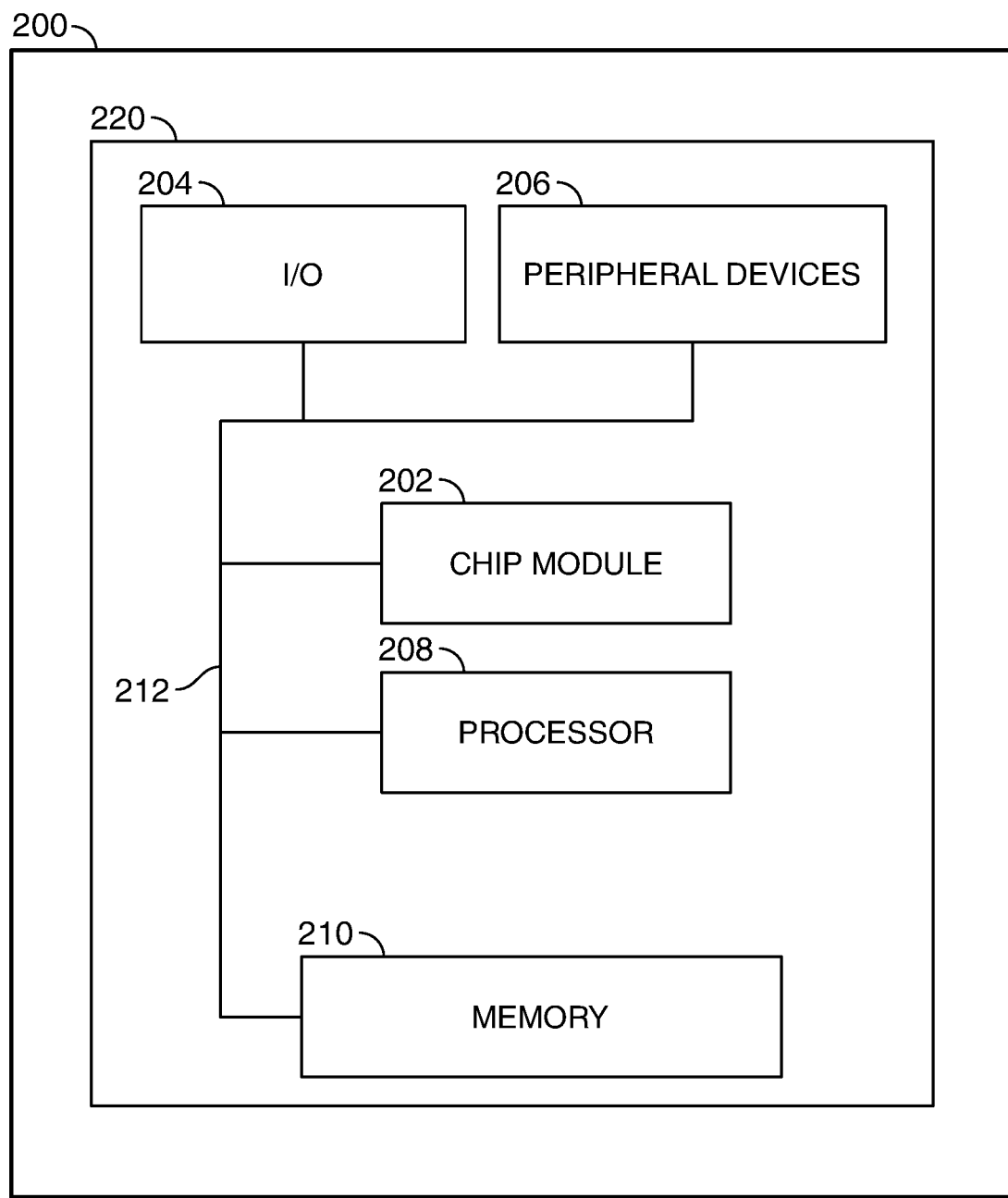
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
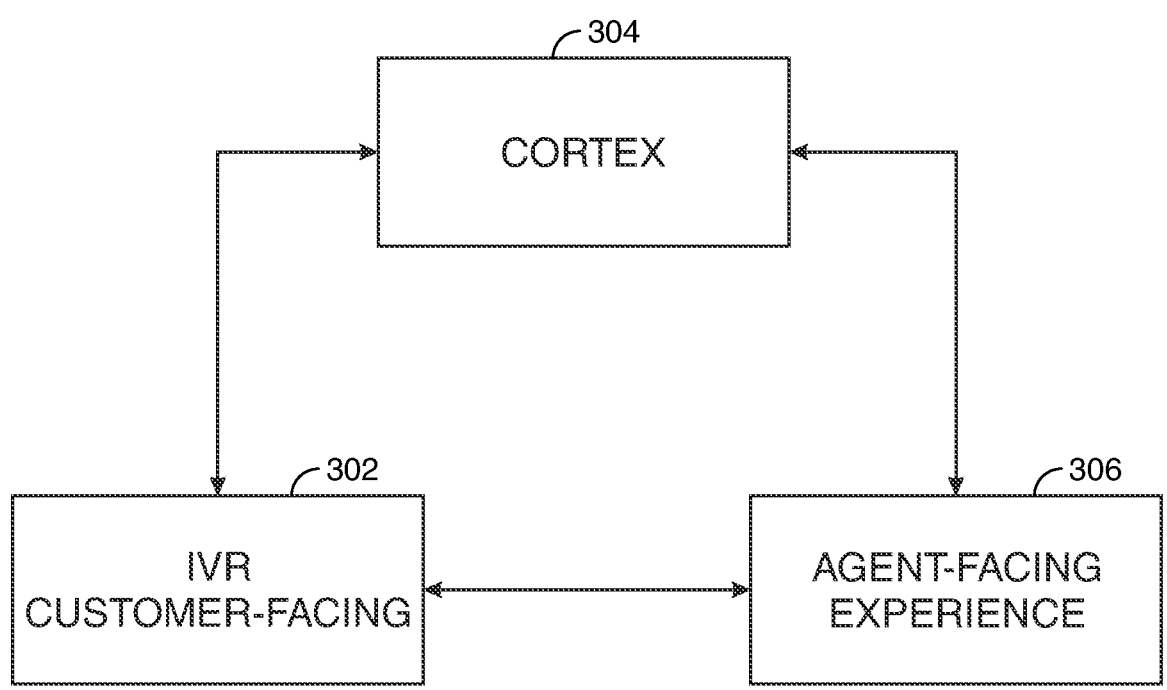
FIG. 3 shows an illustrative schematic diagram of a system according to the disclosure.

FIG. 3 shows an illustrative schematic diagram of a system according to the disclosure. The system may include the following three exemplary components—an IVR (customer-facing) 302, a cortex 304 and an agent-facing experience 306.

The IVR 302 systems of the current embodiments may be configured to operate, at least in part, in response to agent input. The agent may, in certain embodiments, invoke workflows associated with IVR 302.

Workflows associated with IVR 302 may, in certain embodiments, entail receiving requested information from a customer, and responding to the information request. Workflows may, in certain embodiments, entail responding to an agent request.

Workflows may, in certain embodiments, entail providing models for responding to an agent request. For example, an agent may receive a request from a customer and determine that the agent is aware of an appropriate workflow that can be leveraged to respond to the customer request. The agent can then invoke the workflow and activate the workflow to provide a customer response.

In some embodiments of the invention, the system may be configured to leverage a "best-fit" algorithm to provide a list of relevant workflows for the agent to invoke. The agent (or, alternatively, the best-fit algorithm, or other suitable matching algorithm) should preferably match the current agent-customer conversation to an existing workflow from among the relevant workflows.

In some embodiments, this best fit algorithm, or other similarly-purposed algorithm, may leverage artificial intelligence (AI). The AI may use historical responses to stored workflows to determine whether the agent-selected workflows are appropriately selected to respond to the current set of circumstances.

In other embodiments, the agent may be able to source a response from one or more other agents. The one or more other agents may preferably be arranged to interact so as to provide a customer response through the agent that is directly involved with the customer.

It should be noted that the agent that is directly involved with the customer should preferably be provided with a mechanism for intervening with the recently-invoked IVR, to the extent that the agent determines that the IVR response(s) are either 1) incorrect or 2) could be improved upon.

In certain embodiments, the workflow may include an auto-play function. Such a function may preferably involve presenting a preview of the entire conversation (e.g., in block diagram, or other suitable, format) from the IVR. Such a function preferably provides the agent with a preferably concise preview of the back and forth of the proposed conversation that is anticipated by the IVR. Based on this preview the agent may either elect to invoke the workflow as defined in the preview, tune the workflow for the current customer or abandon the workflow and conduct the call manually.

In some workflows, there may be opportunities for agent override triggered throughout the flow. For example, the workflow may, based on one or more factors, determine that an opportunity has presented itself for the agent to take over the customer conversation. The factors may include customer voice level, customer emotion level, a pause in the conversation greater than or equal to a pre-determined amount of time, and/or any other relevant factor.

Alternatively, the workflow may present opportunities to the agent to take over the conversation based on a pre-determined time schedule. For example, the workflow may present override opportunities to the agent at fixed time intervals such as every 20 seconds, every 30 seconds, every minute or at any other pre-determined time schedule. In certain embodiments, as described above, the agent may be enabled to override the IVR and take over the conversation at any time.

In order to instantiate the various functions set forth herein, the IVR preferably interacts with cortex 304. Cortex 304 represents a server or other suitable computer capable of generating responses to customer and/or agent informational requests. In addition, cortex 304 may preferably be adapted for providing audio signals to the customer or agent, as needed, for responding to requests. Cortex 304 may also take over activity, if necessary.

At 306, the agent-facing experience, which may be embodied as a user interface (UI), is shown. UI 306 may preferably be leveraged to provide responses to an agent for use by agent in a conversation. Alternatively, UI 306 may be invoked by the agent to provide responses directly to a customer. In some embodiments, UI 306 may be used by agent to monitor and/or record an agent-customer conversation. Thereafter, UI 306 may be invoked to convert customer-agent conversations into an IVR workflow.

In order to convert a customer-agent conversation into a workflow, there should preferably be, in one embodiment, a strategy in place for extracting the successful (and/or unsuccessful) responses provided by the agent. Thereafter, the successful (and/or unsuccessful) responses could preferably be keyed to terms found in the customer utterances. Once the responses are keyed to terms found in the customer utterances, the responses may preferably be retrieved for future use in future agent-customer or IVR-customer interactions.

It should be noted that, in certain embodiments, the embodiments of UI 306 may preferably provide a screen to the agent that shows the ongoing record of the entire conversation with which the agent is currently involved. Thus, in certain embodiments, the agent can view a real-time electronic record of the conversation in order to avoid mistakes with similar interactions in the future.

Figure 4:
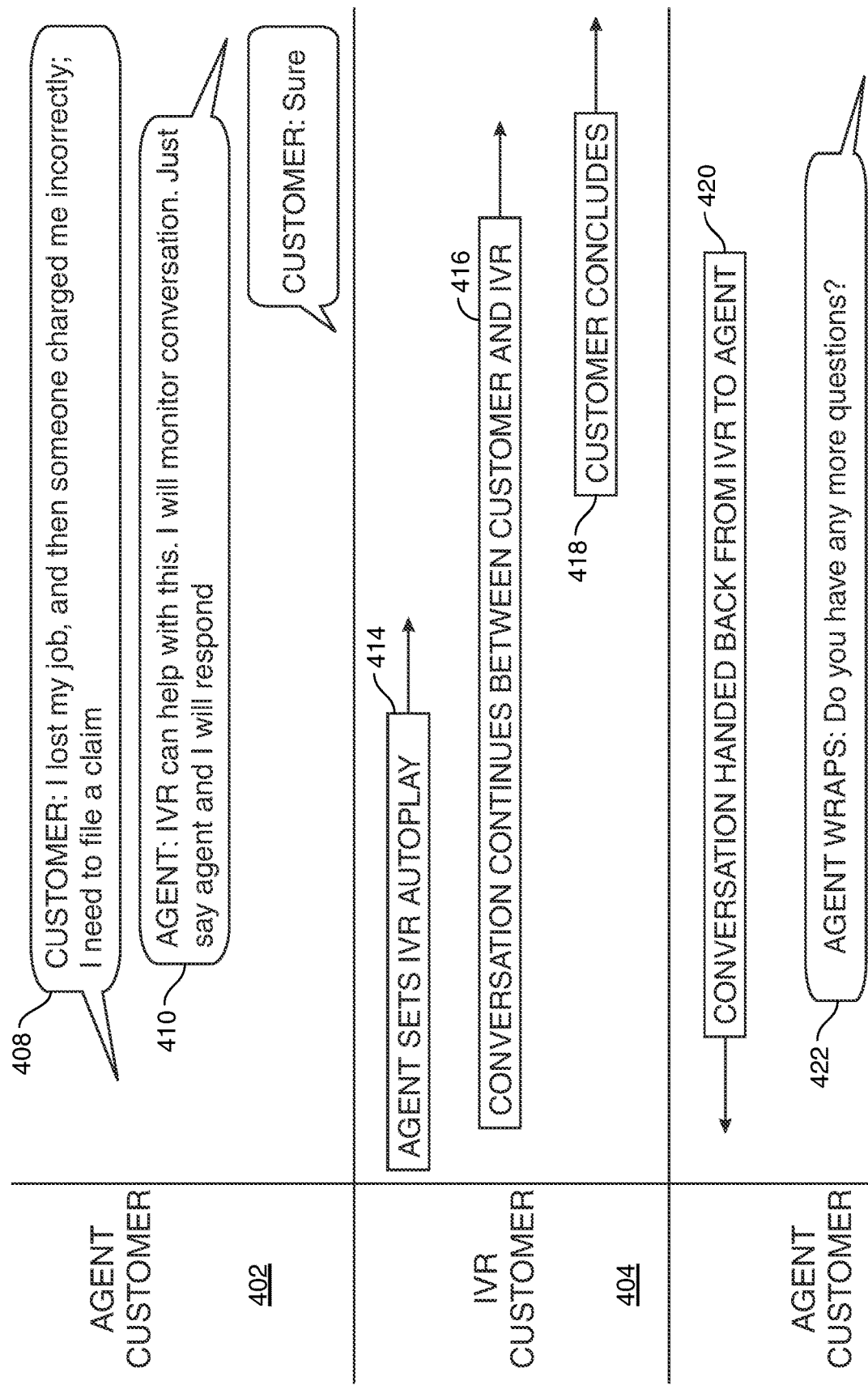
FIG. 4 shows an illustrative diagram of an interaction according to the principles of the disclosure.

FIG. 4 shows an illustrative diagram of an interaction according to the principles of the disclosure. At 402, there exists an agent/customer interaction 408. The customer relates that the customer lost its job and then someone charged the customer incorrectly. The customer needs to file a claim.

The agent responds at 410. The agent communicates that the IVR can help with this issue. The agent confirms that the agent monitors the interaction with the IVR. The agent further communicates that the agent is available at any time, and the customer just has to say the word "agent." This causes the agent to re-enter the conversation and, preferably, terminates the participation of the IVR.

At 404, the interaction of the IVR and the customer is shown. The agent initiates the IVR auto-play at 414. Auto-play may be understood in the context of this application to indicate that the IVR is running, at least temporarily, independent of human agent intervention.

Thereafter, the interaction continues between customer and IVR at 416. At step 418, the IVR/customer interaction concludes (or achieves some other pre-determined milestone). This conclusion of the interaction may be triggered by the system, or manually by the customer. The system-set trigger may flow from a time delay in the conversation, a noticeable change in the tone of customer or any other suitable trigger. In certain embodiments, the trigger (which may itself cause the IVR be marked as one for storing in an AI library) may include an identification of a certain threshold number of heretofore unused words (or key words) in the interaction.

At 406, an agent/customer conclusion of the interaction is shown. At 420, an entity side of the interaction is handed back from the IVR to the agent. At 422, the agent may wrap up the call and ask whether the customer has any more questions; which provides the customer with the finality he needs to move on.

Figure 5:
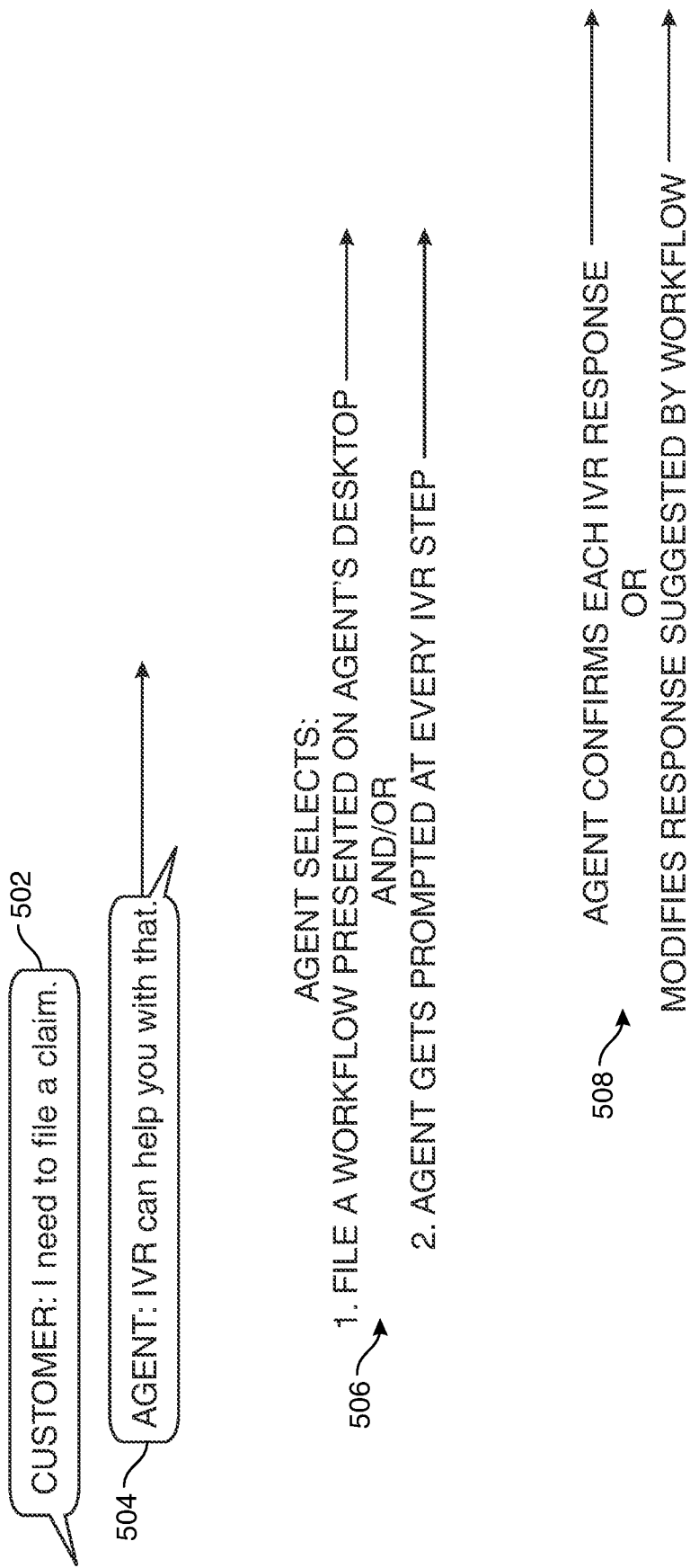
FIG. 5 shows another illustrative diagram according to the principles of the disclosure.

FIG. 5 shows another illustrative diagram according to the principles of the disclosure. At 502, the customer states that the customer needs to file a claim. At 504, the agent responds that the IVR is equipped to help with the particular customer request.

At this point, the agent can either 1) activate a workflow, preferably electronically presented by the IVR, on the agent's desktop, as shown at 506, and have the workflow run independent of constant agent participation or 2) at 508, activate a workflow, preferably electronically presented by the IVR, on the agent's desktop and maintain control over the workflow by requiring that the agent gets prompted at every IVR step prior to the execution by the IVR of the step.

Figure 6:
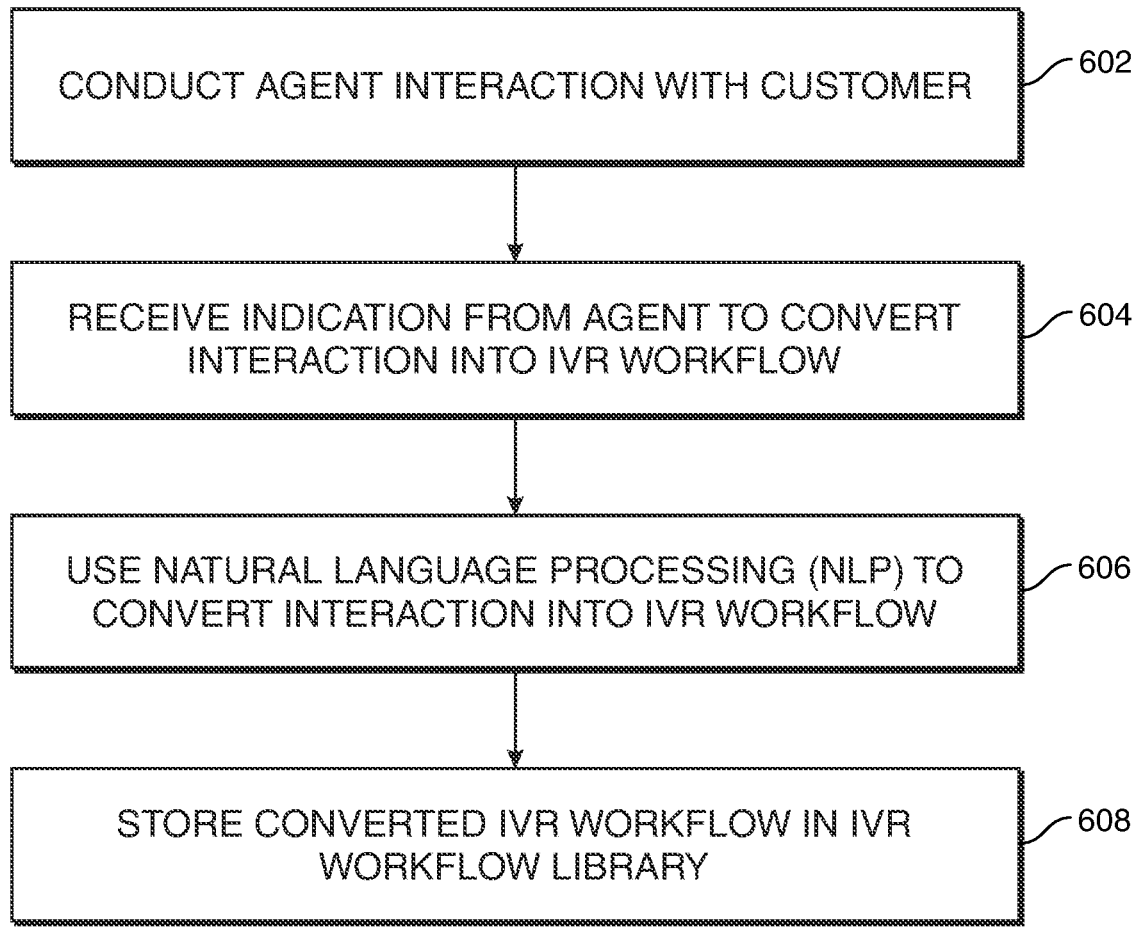
FIG. 6 shows an illustrative flow diagram according to the principles of the disclosure.

FIG. 6 shows an illustrative flow diagram according to the principles of the disclosure. At 602, an agent interaction is conducted with the customer.

Step 604 shows receiving, either, before, during or after the interaction, an indication from the agent to convert the interaction into an IVR workflow. At 606, natural language processing (NLP) may be used to convert interaction into an IVR workflow.

At 608, the IVR workflow may be stored in an IVR workflow library. Such a library may be used for later retrieval in future agent/customer interaction whether with the present agent or a different agent.

Figure 7:
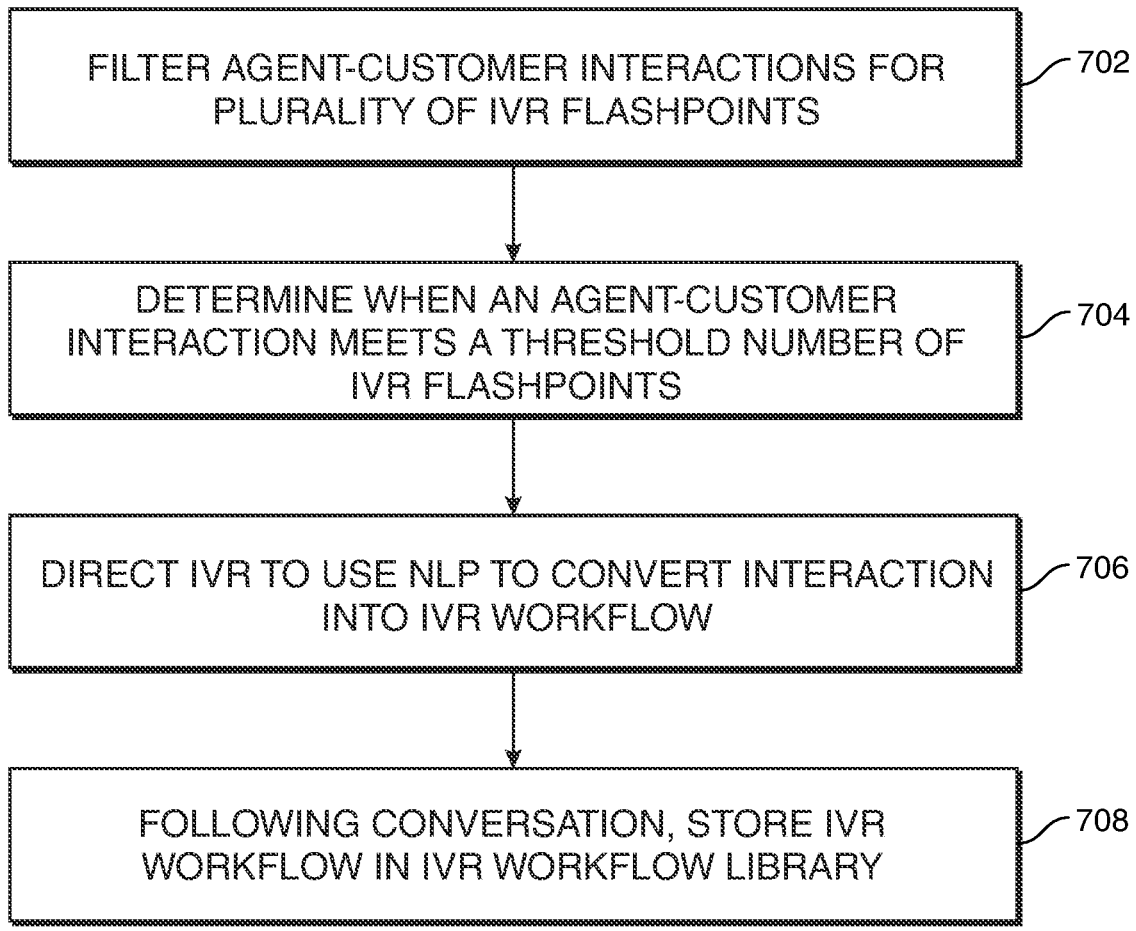
FIG. 7 shows an illustrative flow diagram according to the principles of the disclosure.

FIG. 7 shows an illustrative flow diagram according to the principles of the disclosure. The flow diagram shows one method of triggering automatic decisioning as to whether the system should save a current workflow to a workflow library.

At 702, a filter may be used, the filter being implemented for voice calls preferably using a voice-to-text engine, to filter agent-customer interactions to determine whether a plurality of IVR flashpoints have been identified in the interaction. IVR flashpoints may include, for example, such issues as heretofore-unrecorded customer-relevant subject matter, greater than a predetermined level of emotion (as determined by, for example, customer voice amplitude) and agent response thereto, calls originated abroad, etc.

Once it has been determined that a threshold number of IVR flashpoints have been met (preferably within a predetermined amount of time), as shown at 704, the system may direct the IVR, as shown at 706, to use NLP to convert the current interaction into an IVR workflow. Thereafter, the IVR may store the workflow in an IVR workflow library for reference by the agent, or by other agents.

It should be noted that the workflow library may be indexed according to various different types of information. For example, the workflow library may be indexed by keywords, by participants, by subject matter, by timing or by other suitable relevant information.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer readable data structures.

Thus, methods and systems for an AGENT ASSIST DESIGN—AUTOPLAY are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for building a library of Artificial Intelligence (AI) files related to an interactive voice response (IVR) system, the method comprising:
   using the IVR for monitoring and recording a call center agent-customer interaction, wherein the monitoring and recording comprises using an audio system for receiving an audio file related to the interaction, rendering said audio file into a text file, and recording the text file;
   receiving an electronic instruction to convert the interaction into an IVR workflow, said IVR workflow comprising the text file;
   using a natural language processing (NLP) algorithm to convert the interaction into the IVR workflow;
   storing the IVR workflow in the library of AI files related to IVR, wherein said library is searchable by querying a text string; and
   indexing the library of AI related to the IVR system according to keywords, participants, subject matter and timing;
   based on the storing and indexing, the IVR system is further configured to:
      receive a request from a user to interact with the IVR system;
      retrieve, during agent and customer interactions, IVR workflows, said workflows comprising responses;
      based on the request from the user and said IVR workflows, initiate an auto-play interaction for running the IVR system; and
      conclude the auto-play interaction, said concluding using a system set trigger, the system set trigger retrieved from the library of AI, the system set trigger operational to conclude the auto-play interaction after the IVR system identifies a predetermined time delay in the auto-play interaction;
      wherein said concluding further comprises:
         severing a connection between a customer and the IVR system; and
         triggering an opportunity for an agent override to interact with the customer in place of the IVR system.

2. The method of claim 1 further comprising monitoring an ongoing interaction for a plurality of IVR flashpoints.

3. The method of claim 2 further comprising determining whether an ongoing agent-customer interaction meets a threshold number of the IVR flashpoints.

4. The method of claim 3 further comprising delaying converting the ongoing interaction into the IVR workflow until the threshold number of the IVR flashpoints have been met.

5. The method of claim 3, wherein the threshold number of IVR flashpoints comprises heretofore-unrecorded subject matter.

6. The method of claim 3, wherein the threshold number of IVR flashpoints comprises identification of a call originated abroad.

7. A method for filtering a plurality of agent-customer interactions to determine whether one or more of a plurality of agent-customer interactions should be stored in a library of Artificial Intelligence (AI) files related to an interactive voice response (IVR) system, said method comprising:
   receiving an identification of a plurality of IVR flashpoints;
   receiving at an IVR system a system set trigger, the system set trigger associated with the plurality of agent-customer interactions;
   monitoring and reviewing the plurality of agent-customer interactions;
   determining whether one of the plurality of agent-customer interactions meets a threshold number of the IVR flashpoints;

for each of the plurality of agent-customer interactions that meets a threshold number of the IVR flashpoints, direct the IVR to convert the interaction into an IVR workflow;

store the IVR workflow and the system set trigger in the library of AI related to IVR;

index the library of AI related to the IVR system according to keywords, participants, subject matter and timing;

based on the storing and indexing, the IVR system is further configured to:

receive a request from a user to interact with the system;

retrieve, during agent and customer interactions, IVR workflows, said workflows comprising responses;

based on the request from the user and said IVR workflows, initiate an auto-play interaction for running the IVR system; and conclude the auto-play interaction, said concluding using a system set trigger, the system set trigger retrieved from the library of AI, the system set trigger operational to conclude the auto-play interaction after the IVR system identifies a predetermined time delay in the auto-play interaction;

wherein said concluding further comprises;

severing a connection between a customer and the IVR system; and triggering an opportunity for an agent override to interact with the customer in place of the IVR system.

8. The method of claim 7 further comprising delaying converting the interaction into the IVR workflow until an instruction is received to convert the interaction into the IVR workflow.

9. The method of claim 7, wherein the plurality of IVR flashpoints comprises heretofore-unrecorded subject matter.

10. The method of claim 7, wherein the plurality of IVR flashpoints comprises identification of a call originated abroad.

11. A system for building a library of Artificial Intelligence (AI) files related to an interactive voice response (IVR) system, the system comprising:

a computer for monitoring and recording, as a text file, a call center agent-customer interaction, wherein the system comprises a voice-to-text system for receiving an audio file related to the interaction and rendering said audio file into the text file;

an input and output system for receiving an electronic instruction to convert at least a part of the interaction into an IVR workflow, said IVR workflow comprising the text file;

a natural language processing (NLP) algorithm for converting the interaction into the IVR workflow;

an auto-play function for presenting a preview of the interaction from the IVR to an agent;

a memory for storing the IVR workflow in the library of AI files related to IVR, wherein said library is searchable by querying a text string;

wherein said library is searchable to retrieve an electronic record of an interaction, said searchable to be used in future interactions;

the IVR system further configured to:

receive a request from a user to interact with the system;

retrieve, during agent and customer interactions, IVR workflows, said workflows comprising response;

based on the request from the user and said IVR workflows, initiate an auto-play interaction for running the IVR system; and conclude the auto-play interaction, said concluded using a system set trigger, the system set trigger retrieved from the library of AI files, the system set trigger operational to conclude the auto-play interaction after the IVR system identifies a predetermined time delay in the auto-play interaction;

wherein said concluding comprises:

severing a connection between the customer and the IVR system; and triggering an opportunity for an agent override to interact with the customer in place of the IVR system.

12. The system of claim 11 wherein the computer is further configured to monitor an ongoing interaction for a plurality of IVR flashpoints.

13. The system of claim 12 wherein the computer is further configured to determine whether the call center agent-customer interaction meets a threshold number of the IVR flashpoints.

14. The system of claim 13 wherein the computer is further configured to delay converting the ongoing interaction into the IVR workflow until the threshold number of the IVR flashpoints has been met.

15. The system of claim 12, wherein the plurality of IVR flashpoints comprises heretofore-unrecorded customer-relevant subject key words.

16. The system of claim 12, wherein the plurality of IVR flashpoints comprises identification of a call originated abroad.

* * * * *